March 11, 1924.

T. F. HARROLD

SAFETY ROD

Filed April 24, 1923

1,486,579

Witness

Inventor
T. F. Harrold
By Richard B. Owen.
Attorney

Patented Mar. 11, 1924.

1,486,579

UNITED STATES PATENT OFFICE.

THOMAS F. HARROLD, OF INDIANAPOLIS, INDIANA.

SAFETY ROD.

Application filed April 24, 1923. Serial No. 634,359.

*To all whom it may concern:*

Be it known that I, THOMAS F. HARROLD, a citizen of the United States, residing at Indianapolis, in the county of Marion and State of Indiana, have invented certain new and useful Improvements in a Safety Rod, of which the following is a specification.

The present invention relates to a safety rod for automobiles and the like and has for its principal object to provide a device which may be attached to the forward fenders of an automobile so that a person who is hit by the automobile may have something to grab and prevent himself from being thrown under the wheels. It is the common practice nowadays to use bumpers which project beyond the forward wheels of an automobile and they are elevated so as to hit a person about the knees and quickly upset him and it is natural for such a person to grasp about for something to cling to and my safety rod is disposed in the most convenient place and will prevent injury in most cases.

Another important object of the invention is to provide a device of this nature which is simple in construction, cheaply installed, attractive in appearance, and well adapted to the purpose for which it is designed.

With the above and numerous other objects in view as will appear as the description progresses, the invention resides in certain novel features of construction and in the combination and arrangement of parts as will be hereinafter more fully described and claimed.

In the drawing—

Figure 1:
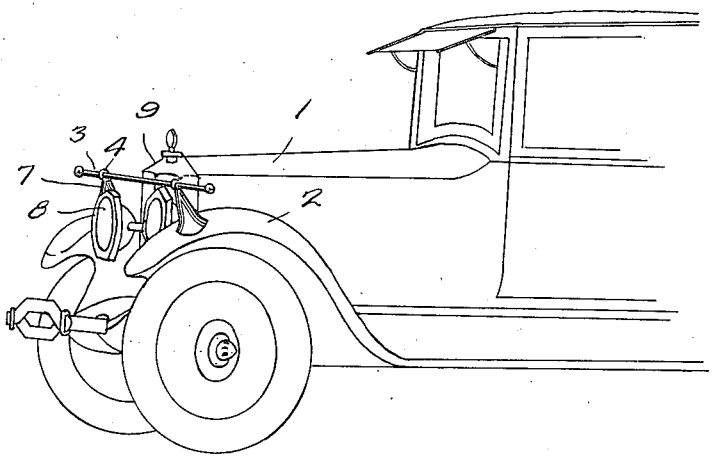
Figure 1 is a perspective of the forward end of an automobile showing my rod attached thereto.
Figure 2:
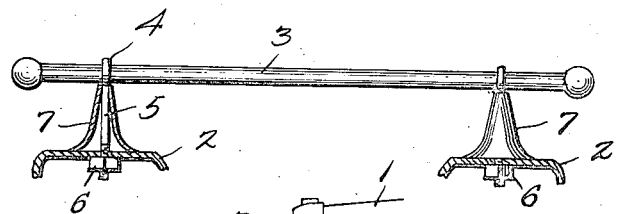
Figure 2 is an elevation of the rod showing the attaching means therefor and also the fenders in transverse section.

Referring to the drawing in detail it will be seen that 1 designates an automobile of any preferred construction having the forward fenders 2. My safety rod 3 in the form shown in Figures 1 and 2 is disposed through the eyes 4 of bolts 5. These bolts 5 pass through the fenders 2 and receive nuts 6. A spacing bell shaped member 7 is disposed about the bolts 5 between the rod 3 and the fenders 2. It is to be noted that the rod is disposed above the headlights 8 in front of the radiator 9 and is therefore conveniently situated to be grasped by a person falling toward the headlights or radiator.

Figure 3:
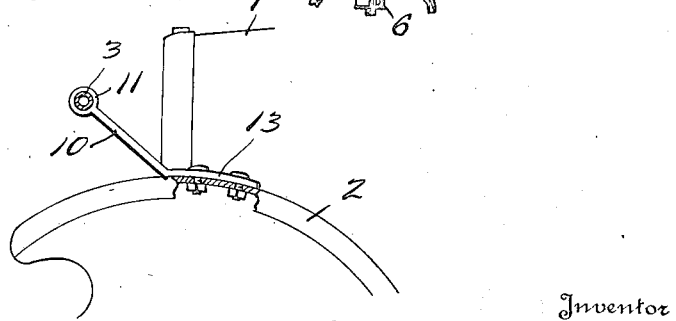
Figure 3 is a fragmentary elevation of the forward end of an automobile showing slightly modified means for mounting the rod.

In the modification shown in Figure 3 the rod 3 is mounted forwardly of the radiator and above the headlights by means of brackets 10. Each bracket 10 includes an eye portion 11 through which the rod passes, a shank which slants downwardly toward the radiator and terminates in a curved portion 13 which is bolted to the adjacent fender.

I have, in the present instance, shown and described the preferred embodiments of the invention which will give in practice satisfactory and reliable results, and it is to be understood that the same are susceptible of modification in various particulars without departing from the spirit or scope of the invention or sacrificing any of its advantages.

Having thus described my invention what I claim as new is:—

1. In combination, an automobile including a pair of fenders at its forward end, a rod, and means for mounting the rod on the fenders forwardly of the radiator and above the headlights of the automobile.

2. In combination, an automobile including a pair of fenders, headlights, and a radiator, a rod, a pair of bolts terminating in eye portions at one end for receiving the rod, said bolts passing through the fenders, nuts engaging the terminals which pierce the fenders, and spacing means on the bolts so as to hold the rod in spaced relation to the fenders above the headlights and forwardly of the radiator.

In testimony whereof I affix my signature in presence of two witnesses.

THOMAS F. HARROLD.

Witnesses:
  CLARA I. HARROLD,
  ELIZABETH F. HARROLD.